MAGNETIC RECORDING MEDIUM

Filed May 24, 1972

INVENTORS
GORO AKASHI
MASAAKI FUJIYAMA
TATSUJI KITAMOTO

BY Sughrue, Rothwell, Mion, Zinn & Macpeak
ATTORNEYS

United States Patent Office 3,824,128

Patented July 16, 1974

3,824,128

MAGNETIC RECORDING MEDIUM

Goro Akashi, Tatsuji Kitamoto, and Massaki Fujiyama, Kanagawa, Japan, assignors to Fuji Photo Film Co., Ltd., Kanagawa, Japan Continuation-in-part of abandoned application Ser. No. 864,482, Oct. 7, 1969. This application May 24, 1972, Ser. No. 256,245

Claims priority, application Japan, Nov. 6, 1968, 43/81,068

Int. Cl. H01j *1/26*

U.S. Cl. 117—235 9 Claims

ABSTRACT OF THE DISCLOSURE

A magnetic recording medium having a magnetic recording layer in which is dispersed in a binder a ferromagnetic powder comprising a mixture of an iron oxide powder and a chromium dioxide powder in a weight ratio of 1:4 to 4:1 respectively, and possessing improved sensitivity to short wave-length signals, particularly even after being subjected to heat.

CROSS REFERENCE TO RELATED APPLICATIONS

Figure 1:
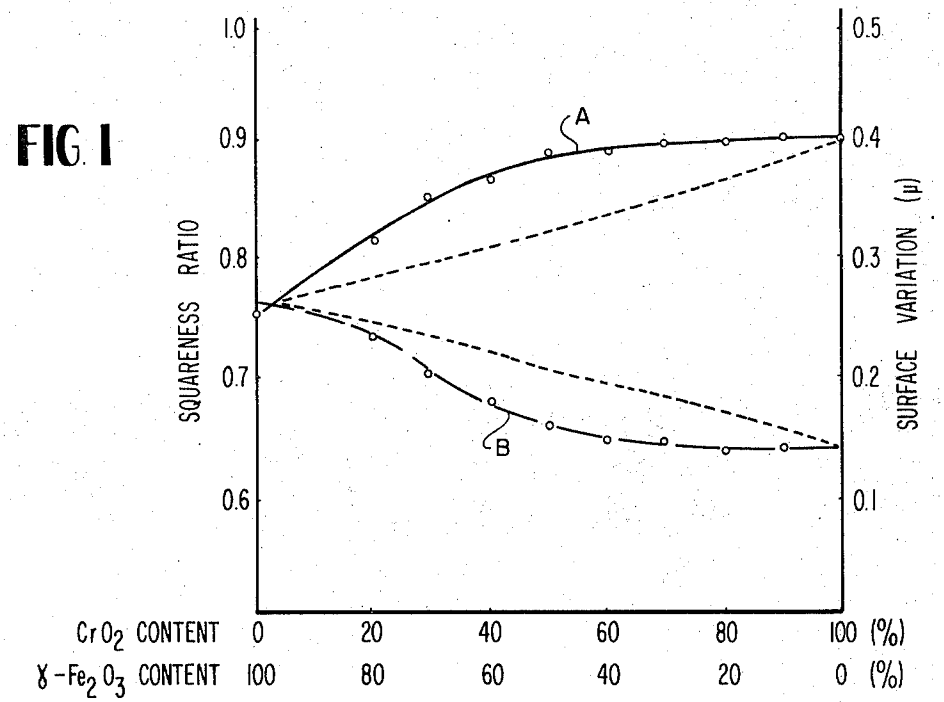

This is a continuation-in-part application of copending application, Ser. No. 864,482 filed Oct. 7, 1969, now abandoned.

1. Field of the Invention

This invention relates to a magnetic recording medium, and particularly, to a composition of a ferromagnetic powder to be dispersed in a magnetic recording layer of a magnetic recording medium.

2. Description of the Prior Art

A conventional magnetic recording medium is composed of a support such as a plastic film, a metal- or glass-plate, etc., and a magnetic recording layer provided thereon by coating an acicular or granular powder of a ferromagnetic substance of less than 5 microns in size dispersed in a resinous binder and drying. Several substances, such as iron oxides, chromium dioxide, and ferromagnetic alloys are hitherto known as such ferromagnetic substances. Among them, iron oxides, such as $\gamma$-$Fe_2O_3$, $Fe_3O_4$ or modified ones containing a small amount of cobalt, nickel, chromium, manganese, zinc, etc., have been mainly used because they can be produced at a low cost and with ease, such as without the necessity for using high temperatures and high pressures.

In recent years, the magnetic recording of short wave-length signals meaning a high density magnetic recording in which the minimum recording wave-length of signal in the conventional magnetic sound recording is 19 microns, whereas in the case of video image recording the ability to record and reproduce signal of wave-length as short as 2 to 3 microns is required, has rapidly been developed.

The inventors have found the following five characteristics to be required for such high density recording.

(1) a high coercive force
(2) an excellent surface smoothness of the magnetic recording layer which depends on the dispersibility of the ferromagnetic substances
(3) a high squareness ratio of the B–H curve
(4) heat stability
(5) a high packing-density of the ferromagnetic powder in the magnetic recording layer In these requirements, characteristics (1) to (4) are mainly required for a ferromagnetic substance whereas characteristic (5) is required only for the magnetic recording layer. Ferromagnetic iron oxides conventionally employed for magnetic recording media deteriorate in squareness ratio ($Br/Bm$) of the B–H curve when the coercive force thereof increases and it is very difficult to obtain the desired surface property with such materials because of the characteristics of the $\gamma$-$Fe_2O_3$ modified with cobalt or other metals and with both $\gamma$-$Fe_2O_3$ or $Fe_3O_4$ modified with cobalt. Accordingly, it is difficult to manufacture a magnetic recording substance suitable for high density recording using conventional ferromagnetic substances such as $\gamma$-$Fe_2O_3$, $Fe_3O_4$ or the like.

SUMMARY OF THE INVENTION

The magnetic recording medium of the present invention has a magnetic recording layer comprising a ferromagnetic powder dispersed in a binder and is characterized in that said ferromagnetic powder is a mixture of (1) powdered ferromagnetic iron oxide and/or iron oxide modified with Co, Ni, Cr, Mn, Zn, and equivalents thereof and (2) powdered ferromagnetic $CrO_2$, and/or $CrO_2$ modified with Te, Sb, Sn, Sn, Fe, and the equivalents thereof employed in a weight ratio of 1:4 to 4:1.

An object of the invention is to provide a ferromagnetic composition which overcomes the above mentioned disadvantages in substances conventionally used.

Another object of the present invention is to provide a magnetic recording medium having a magnetic recording layer containing the new ferromagnetic composition.

A further object of the present invention is to provide a magnetic recording medium having improved sensitivity to shortwave length signals, particularly even after being subjected to heat.

These and other objects of the present invention will be illustrated hereinafter in greater detail.

BRIEF DESCRIPTION OF THE ACCOMPANYING DRAWINGS

The drawings are graphical presentations of the magnetic properties obtainable with the magnetic recording medium of this invention.

DETAILED DESCRIPTION OF THE INVENTION

The ferromagnetic powder preferred in the practice of the present invention include $\gamma$-$Fe_2O_3$, $Fe_3O_4$ or either of these oxides modified with at least one metal selected from the group consisting of Co, Ni, Cr, Mn, Zn and Cu as described in U.S. Pat. No. 3,117,933; British Pat. Nos. 717,269 and 721,630; and West German Pat. No. 891,-625, as the ferromagnetic iron oxide, and $CrO_2$ as described in U.S. Pat. No. 2,956,955 or $CrO_2$ modified with at least one atom selected from the group consisting of Te, Sn, Sb, Ti, V, Cr, Mn, Fe, Co, Ni, N, P, As, Bi, Nb, Ta, Ru and alkali metals as described in U.S. Pat. Nos. 2,885,365; 2,923,684; 2,923,685; 3,034,988; 3,068,176 and 3,243,260, as the ferromagnetic chromium oxide.

The process of the modification of those substances to be modified, the amount of modifying element used and other conditions necessary to obtain the modified substances, are described in the above-mentioned patent specifications.

In any of these ferromagnetic powders, the diameter thereof should be less than about $2\mu$, preferably, about $1$–$0.2\mu$.

In accordance with the present invention, the above ferromagnetic iron oxide powder and ferromagnetic chromium oxide powder are mixed in a weight ratio of 4:1 to 1:4. This range of the ratio will be explained in detail referring to the drawings (in Example 1).

The above-described powders are dispersed in a solution comprising a binding agent and an organic solvent in order to form a magnetic recording layer (i.e., a layer with magnetic properties). This binding agent is a high molecular weight compound having film-forming properties and, after the formation of a film, having some resistance to abrasion, and capable of forming an adhesive coating composition onto the surface of a support or a subbing layer provided on the support.

Specific examples of such binding agents are vinyl chloride-vinyl acetate copolymer, epoxy resin, nitrocellulose, polyester resin, chlorinated polyethylene resin, polyvinyl butyral, acrylic acid resin, methacrylic acid resin, amino resin, vinylidene chloride-acrylonitrile copolymer, phenol resin, urea resin, melamine resin, polyamide resin butadiene-acrylonitrile copolymer, etc. All of these are publicly known high polymers and may be used independently or in combination by considering the properties of the resulting film obtained. These binding agents are employed in an amount ranging from about 50 to 180 parts by weight, preferably from about 70 to 120 parts by weight for each 300 parts by weight of the ferromagnetic powders. When used in an amount outside this range, the magnetic characteristics of the resulting magnetic layer will be insufficient if too much binding agent is used, while the resulting magnetic layer formed will be too fragile and the adhesiveness to the support will deteriorate if too great an amount of the ferromagnetic powder is used.

Once the ingredients of the binding agent are selected, an organic solvent to dissolve the ingredient is then chosen. In selecting the organic solvent, such solvents which do not dissolve or swell the support used must be selected if a high polymer is used as a support.

As specific examples of organic solvents, there are illustrated esters such as methyl acetate, ethyl acetate, propyl acetate, butyl acetate, and amyl acetate; hydrocarbons such as toluene, xylene, alcohols such as ethanol, propanol, butanol, and amyl alcohol; liquid chlorinated hydrocarbons such as methylene dichloride, and ethylene dichloride; dimethyl sulfoxide, dimethyl formamide; ketones such as methyl ethyl ketone, and methyl isobutyl ketone, etc. One or more of these solvents can be properly selected.

Fundamentally, the coating solution for forming the magnetic recording layer is that obtained by dispersing the above-described ferromagnetic powders in an organic solution containing the binding agent above. But, since this solution is applied to a support in a subsequent step, additives which are helpful for conducting the coating step rapidly and smoothly and for forming a coating film which is uniform in composition and thickness, such as a coating agent capable of improving the coating properties so that the coating to a support can be effected rapidly and uniformly, an antifoaming agent for the coating solution and a dispersing agent for the ferromagnetic powders, and additives necessary for improving the characteristics of the resulting magnetic recording medium, such as a lubricant, may be added to the coating solution.

In addition, it is required further to knead the ingredients of the coating solution sufficiently in order to obtain a completely uniform composition at any part of the resulting coating film. It is necessary to give the coating solution an appropriate viscosity by adjusting the amount of above-mentioned organic solvent added such that it can be applied to a support at room temperature and so that it is capable of forming a magnetic layer having the desired thickness, and that orientation of the ferromagnetic powders conducted in a magnetic field is possible immediately after the coating.

The coating solution may be prepared by charging each of the ingredients into a mixing vessel such as a ball mill. Conventional techniques may be satisfactorily employed as to the mixing method, the mixing order or the means employed for mixing.

The coating solution thus obtained is then applied to the support or a subbing layer provided so as to improve the adhesiveness between the support and the magnetic layer. The amount of the coating solution applied is so adjusted that the resulting coating layer has sufficient thickness to exhibit the necessary magnetic characteristics.

As the support for a magnetic recording medium, there are illustrated various materials such as metals, e.g., aluminum, high polymers, e.g., polyethylene terephthalate and cellulose acetate, glass and paper. They may be used in the form of tapes, sheets, discs, drums, etc., in accordance with the expected use or apparatus to which they are applied.

When the resulting magnetic recording medium is formed into a tape, orientation of the ferromagnetic powders is conducted generally immediately after applying the coating solution to a support. Methods of orientation in a magnetic field are described in Japanese Patent Publication Nos. 3,567/53; 21,571/61; 13,931/62; 3,037/63; 19,281/64; 23,677/64; 25,245/64; 26,636/64; 26,908/64; 29,471/64; 5,350/65; 5,351/65; 23,623/65; 23,624/65; 23,625/65; 23,626/65; 23,945/65; 2,065/66; 21,146/67; 15,207/68; 21,251/68; and U.S. Pat. 2,711,901, and thus, such methods are well known to the art. This orientation in a magnetic field may be replaced by a mechanical orientation. However, the mechanical orientation is conducted after the drying of the coated substance.

After conducting the orientation in a magnetic field, the coated substance is immediately dried to maintain the ferromagnetic powders in the oriented state. Thereafter, any necessary after-treating such as abrasion of the formed surface of the magnetic layer is conducted, and the resulting substance is properly formed into a desired shape.

The magnetic recording medium in accordance with the present invention is extremely excellent in surface properties (i.e., in surface durability and the smoothness of the magnetic layer) and the squareness ratio of the B–H curve is likewise excellent. Further, they can be manufactured more cheaply than in the case of using a magnetic substance of chromium dioxide alone. They are also characterized by excellent thermal stability.

Comparative Example 1

32 g. of nitrocellulose as a binder, 9 g. of dibutyl phthalate, 1 g. of castor oil and 100 g. of acicular $\gamma$-$Fe_2O_3$ having an average particle size of 0.6 x 0.1 x 0.1$\mu$ were placed in a ball mill together with 230 cc. of ethyl acetate and the resultant composition was stirred for 4 days to disperse and to prepare a coating composition. Thereafter, the composition thus obtained was coated on a polyethylene terephthalate film of 24$\mu$ in thickness and while the magnetic layer was still wet, the coating was subjected to a magnetic field to orient the acicular particles in order to provide maximum sensitivity in the recording direction. Then the coating was dried to form a film having a dried thickness of 5$\mu$. The surface of the coating of the material so obtained was treated using a super calender (a surface calendering roll) and, thereafter, was slit to make a magnetic tape.

The characteristics of the resultant magnetic recording tape included a coercive force of 310 oe. and a square ness ratio of 0.76. The tape had a surface variation of 0.26$\mu$.

In testing the reproducing sensitivity of this magnetic recording tape at a recorded wavelength of 3$\mu$ in a video tape recorder capable of recording video signals at a relative velocity of 11 m./sec. with respect to the magnetic head, the output power was found to be lower than the desired value by about 2 db.

Comparative Example 2

As a means for improving the squareness ratio and the surface properties of magnetic recording media appropriate selection of binders and the addition of suitable dispersing agents, etc. have been suggested. Therefore, a magnetic recording medium was prepared with a magnetic iron oxide in combination with one or more resins selected from epoxy resins, acrylic resins, urea resins, cellulose resins, etc. as a binder and one or more surface active agents selected from the quaternary ammonium salts and alkyl pyridinium salts, polyoxyethylene alkylether, polyoxyethylene alkyl ester, sorbitan aliphatic acid ester, and anionic alkyl phosphoric acid ester salts and alkyl sulfuric acid salts, etc. as the dispersing agent. The characteristics of such magnetic recording media were then tested. Even in the best case, the surface variation obtained was about 0.2μ and the squareness ratio (*Br/Bm*) was only about 0.77. Therefore, the output power obtained from this medium was +1db. at a recorded wavelength of 3μ in comparison with the medium of Comparative Example 1.

Comparative Example 3

32 g. of nitrocellulose as a binder, 7 g. of dibutylphthalate, 1 g. of castor oil, and 100 g. of $CrO_2$ having a coercive force of about 320 oe. were charged into a ball mill together with 100 g. of ethyl acetate as a solvent and, after dispersion treatment for 4 days, the resultant dispersion was coated on a polyethylene terephthalate film of 24μ in thickness and dried so as to give a dried thickness of 5μ. The coated material so obtained was treated using a super calender and thereafter, was slit to obtain the desired magnetic recording tape. After the above coating step and before the coating layer was dried, the magnetic medium was subjected to the magnetic orientation treatment of Comparative Example 1, which is commonly carried out in manufacturing a magnetic recording medium. The resultant magnetic recording tape possessed a coercive force of 320 oe. and a squareness ratio of 0.90. The tape surface was even, having a surface variation of 0.14μ.

Testing of the resultant tape at a recorded wavelength of 3μ in the same manner as in Comparative Example 1 showed this magnetic tape to be +2 db. in output power and higher in reproducing output than that in Comparative Example 1 by 4 db. It was therefore suitable for high density recording in this respect. However, a decrease of reproducing output as a result of heating was observed, which is a characteristic of $CrO_2$. The reproducing output after 1 hour at 90° C. was found to have been lowered to about half of the initial output. Therefore, in case of using $CrO_2$ as in the present Comparative Example, should the tape be heated after recording it becomes practically impossible to reproduce the recorded signal.

Example 1

32 g. of nitrocellulose as a binder, 8 g. of dibutyl phthalate, 1 g. of castor oil and 100 g. of each of ferromagnetic powders as disclosed below were mixed together with 230 cc. of ethyl acetate as a solvent in a ball mill for 4 days to prepare a coating composition. In this case, the ferromagnetic powders were a powder of acicular $\gamma$-$Fe_2O_3$ having an average particle size of 0.6 x 0.1 x 0.1μ and having a coervice force of 320 ic., a powder of acicular $CrO_2$ having an average particle size of 0.7 x 0.1 x 0.1μ and having a coercive force of 320 oe. alone, and nine mixtures of both powders in weight ratios ranging from 1:9 to 9:1 shown in the drawings were prepared.

Each of the prepared coating compositions was coated on polyethylene terephthalate films having a thickness of 24μ and subjected to magnetic orientation treatment before the coating layer was fixed and dried as in the conventional production thereof.

The characteristics of the magnetic recording tapes so obtained, i.e., in surface properties and the squareness ratio of the B–H curve (*Br/Bm*) were measured. Also the amount of lowering of the reproducing output caused by heat were measured. The results shown in FIGS. 1 and 2 were obtained.

Figure 2:
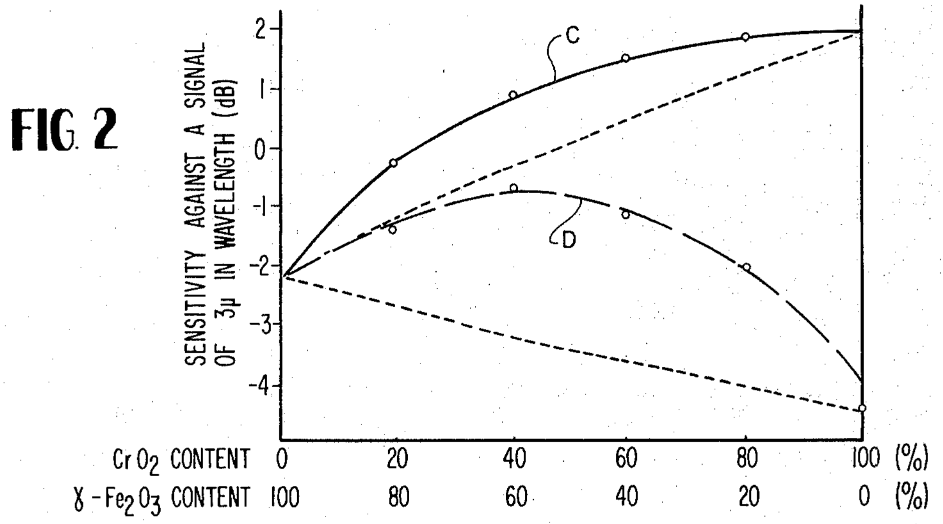

In FIGS. 1 and 2, the absicissas shows 100% of $\gamma$-$Fe_2O_3$ powder at the left end and 100% of $CrO_2$ powder at the right end and shows the mixing ratio, by weight, of both powders in between. The ordinates show the squareness ratio (*Br/Bm*) and the surface unevenness (units:μ) in FIG. 1 and shows the sensitivity (unit:db) for a signal of 3μ in recorded wavelength in FIG. 2.

In FIG. 1, Curve A shows the squareness ratio and Curves B shows the surface unevenness. In FIG. 2, Curve C shows the output before heating and Curve D shows the output after heating.

From the results shown in FIG. 1, it will be understood that the surface unevenness, squareness ratio, etc. of the magnetic recording tape were improved with an increase in the content of $CrO_2$ and were abruptly elevated at the point of 20% in the ratio of $$\frac{CrO_2}{\gamma-Fe_2O_3+CrO_2}$$

Also, from the results shown in FIG. 2, the reproducing output measured after recording a signal of 3μ in recorded wave-length on the magnetic recording tape followed by heating at 90° C. for 1 hour was improved by mixing. That is, an excellent magnetic recording tape, usable both under ordinary temperatures and under high temperatures can be obtained by employing a $CrO_2$/$\gamma$-$Fe_2O_3$ ratio ranging from 1/4 to 4/1.

Example 2

32 g. of nitrocellulose as the main ingredient of a binder 8 g. of dibutyl phthalate, 1 g. of castor oil and 50 g. each of $CrO_2$ and $\gamma$-$Fe_2O_3$ modified with Co, each possessing a coercive force of 420 oe. were treated in a ball mill for 4 days and, thereafter, were coated on a polyethylene terephthalate film of 24μ in thickness and dried so as to give 5μ of dried thickness. Further, the surface of the coating was treated by means of a supercalender and was slit to prepare a magnetic recording tape. After coating of the magnetic lacquer, the material was subjected to the magnetic orientation treatment as described above before the coating layer was dried, as in case of the production of a conventional magnetic medium.

The characteristics of the magnetic recording tape thus obtained were a coercive force of 420 oe. and a squareness ratio of 0.87. The tape possessed surface variations of 0.15μ. In the case of recording a signal of 3μ in recorded wavelength, the tape showed +2.1 db in reproducing sensitivity and was then suitable for high density recording.

Alternatively, the characteristics of a recording medium composed of $\gamma$-$Fe_2O_3$ not containing $CrO_2$ and modified with Co, which was manufactured in the same manner included a squareness ratio of 0.705, surface variations of 0.23μ and −1.2 db in reproducing output.

As shown in the above Examples, the present invention provides the effect of improving the characteristics of a magnetic recording medium such as the surface smoothness and squareness ratio in the B–H curve, which cannot be obtained in case of using only magnetic iron oxide as a magnetic powder for magnetic recording medium and in addition results in another effect, a decrease in the reduction of output by heating, which is caused when only magnetic chromium dioxide is employed.

The reason for the deterioration in output power of a magnetic recording medium comprising chromium dioxide, when heated, is the lower Curie point of the magnetic material itself. Further, the reason why the combination of iron oxide and chromium dioxide according to the present invention lessens such deterioration is believed to be that magnetization of the iron oxide itself is not lowered because of its high Curie point and the chromium dioxide is remagnetized during cooling to room temperature after heating because of its low coercive force at high temperature.

Further, by operating in accordance with the present invention, the magnetic recording medium can be manufactured more cheaply by blending relatively cheap magnetic iron oxide powder since the manufacturing cost of chromium dioxide is high.

A remarkable feature of the present invention is that the effects of mixing chromium dioxide powder and magnetic iron oxide powder do not vary in proportion to the ratio of the mixed powders, the mixture of these materials having proved to be synergistic in effect. That is, as shown in FIG. 1, almost same level of squareness ratio and surface properties are maintained even if a considerable amount of iron oxide is added to the $CrO_2$ Further, as shown in FIG. 2, the chromium dioxide is not significantly lowered in output power before heating until a considerable amount of iron oxide has been added. Further, its output power after heating reaches a maximum point at almost a ratio of $CrO_2$ to $\gamma$-$FeO_3$ of 40:60 in the mixture. In both Figures, the expected values are shown by the dotted lines, indicating that such remarkable effects have not hitherto been anticipated.

Although the present invention is not to be limited by any theory of operation, these effects are believed to depend upon the $CrO_2$ particles, having good orientation, promoting the orientation of the iron oxide particles and, further, the thermal stability of iron oxide particles stabilizing the $CrO_2$ interposed therein.

What is claimed is:

1. In a magnetic recording medium comprising a support bearing thereon at least one magnetic recording layer comprising ferromagnetic powder dispersed in a binder, the improvement consisting essentially of said ferromagnetic powder comprising a mixture of:

(a) a ferromagnetic iron oxide powder selected from the group consisting of ferromagnetic iron oxide and ferromagnetic iron oxide modified with a modifying amount of at least one member selected from the group consisting of cobalt, nickel, chromium, manganese, zinc and copper; and (b) a ferromagnetic chromium dioxide powder selected from the group consisting of a ferromagnetic chromium dioxide and a ferromagnetic chromium dioxide modified with a modifying amount of at least one member selected from the group consisting of tellurium, tin, antimony, titanium, vanadium, chromium, manganese, iron, cobalt, nickel, nitrogen, phosphorus, arsenic, bismuth, niobium, tantalum, ruthenium, or an alkali metal the weight ratio of said ferromagnetic iron oxide powder to said ferromagnetic chromium dioxide powder being from 1:4 to 4:1.

2. The magnetic recording medium of claim 1 wherein said ferromagnetic iron oxide powder is $\gamma$-$Fe_2O_3$ or $Fe_3O_4$.

3. The magnetic recording medium of claim 1 wherein netic chromium dioxide powder are both acicular. said ferromagnetic iron oxide powder and said ferromag-

4. The magnetic recording medium of claim 1 wherein said binding agent is a synthetic resin selected from the group consisting of a vinyl chloride-vinyl acetate copolymer, an acrylic resin, a cellulose resin, an epoxy-polyamide resin, a polyurethane resin and combination thereof.

5. The magnetic recording medium of claim 1 wherein said ferromagnetic iron oxide powder and said ferromagnetic chromium dioxide powder are both granular.

6. The magnetic recording medium of claim 2 wherein said ferromagnetic chromium dioxide powder is ferromagnetic chromium dioxide.

7. The magnetic recording medium of claim 6 wherein the weight ratio of said ferromagnetic iron oxide powder to said ferromagnetic chromium dioxide is about 60:40.

8. The magnetic recording medium of claim 1 wherein the diameter of said ferromagnetic iron oxide powder and said ferromagnetic chromium dioxide powder is less than 2 microns.

9. A magnetic recording medium having excellent surface smoothness, improved squareness ratio and a resistance to output reduction on heating, said magnetic recording medium comprising a support bearing thereon at least one magnetic recording layer which comprises ferromagnetic powder dispersed in a binder therefor, said ferromagnetic powder consisting essentially of a mixture of:

(1) a ferromagnetic iron oxide powder selected from the group consisting of ferromagnetic $\gamma$-$Fe_2O_3$ or ferromagnetic $Fe_3O_4$ and said ferromagnetic materials modified with a modifying amount of at least one member selected from the group consisting of cobalt, nickel, chromium, manganese, zinc and copper; and (2) a ferromagnetic chromium dioxide powder selected from the group consisting of ferromagnetic $CrO_2$ and ferromagnetic $CrO_2$ modified with a modifying amount of at least one member selected from the group consisting of tellurium, tin, antimony, titanium, vanadium, chromium, manganese, iron, cobalt, nickel, nitrogen, phosphorus, arsenic, bismuth, niobium, tantalum, ruthenium, and an alkali metal;

the weight ratio of said ferromagnetic iron oxide powder to said ferromagnetic chromium dioxide powder being from 1:4 to 4:1, wherein said ferromagnetic iron oxide powder and said ferromagnetic chromium dioxide powder are either both acicular or both granular.

References Cited

UNITED STATES PATENTS 3,613,100 10/1971 Kaufer et al. ------- 117—235

DANIEL E. WYMAN, Primary Examiner

A. P. DEMERS, Assistant Examiner

U.S. Cl. X.R.

117—238, 239; 252—62.54